United States Patent
Anyuru et al.

(10) Patent No.: US 10,447,433 B2
(45) Date of Patent: Oct. 15, 2019

(54) SIGNAL PROCESSING APPARATUS AND METHOD

(71) Applicant: Telefonaktiebolaget LM Ericsson (publ), Stockholm (SE)

(72) Inventors: Andreas Anyuru, Cambridge (GB); Johan Georg Michael Uggmark, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 71 days.

(21) Appl. No.: 15/527,352

(22) PCT Filed: Nov. 21, 2014

(86) PCT No.: PCT/EP2014/075342
§ 371 (c)(1),
(2) Date: May 17, 2017

(87) PCT Pub. No.: WO2016/078731
PCT Pub. Date: May 26, 2016

(65) Prior Publication Data
US 2017/0331588 A1    Nov. 16, 2017

(51) Int. Cl.
*H04L 1/00* (2006.01)
*H04L 1/18* (2006.01)
(Continued)

(52) U.S. Cl.
CPC .......... *H04L 1/0052* (2013.01); *H04L 1/0045* (2013.01); *H04L 1/1816* (2013.01);
(Continued)

(58) Field of Classification Search
CPC ... H04L 1/0045; H04L 1/1845; H04L 1/1816; H04L 5/0055; H04L 1/0052; H04W 28/04
See application file for complete search history.

(56) References Cited

U.S. PATENT DOCUMENTS 6,466,159 B1    10/2002    Rotgans
6,857,042 B1    2/2005    Floman
(Continued)

FOREIGN PATENT DOCUMENTS

EP    1507352 A1    2/2005
WO    WO9857332    12/1998

OTHER PUBLICATIONS

JEDEC Solid State Technology Association, "Low Power Double Data Rate 2 (LPDDR2)", JEDEC Standard JESD209-2B, Feb. 2010, pp. 1-238, (Revision of JESD209-2A, Oct. 2009).

*Primary Examiner* — Guy J Lamarre
(74) *Attorney, Agent, or Firm* — Coats & Bennett, PLLC

(57) ABSTRACT

A method of operating a signal processing apparatus (110) comprises receiving a first signal representing a received data bit, determining from the first signal a first soft data bit, storing the first soft data bit in a leaky storage device (130), receiving a second signal representing the received data bit, and determining from the second signal a second soft data bit. The stored first soft data bit is read from the leaky storage device (130), an elapsed leakage time of the stored first soft data bit is measured, and a third soft data bit is generated dependent on the stored first soft data bit read from the leaky storage device (130) and on the elapsed leakage time. A fourth soft data bit is generated by combining the second soft data bit and the third soft data bit, and the received data bit is decoded dependent on the fourth soft data bit and on a selected plurality of further received data bits.

15 Claims, 3 Drawing Sheets

(51) Int. Cl.
*H04W 28/04* (2009.01)
*H04L 5/00* (2006.01)

(52) U.S. Cl.
CPC ........... *H04L 1/1845* (2013.01); *H04W 28/04* (2013.01); *H04L 5/0055* (2013.01)

(56) References Cited

U.S. PATENT DOCUMENTS

| | | | |
|---|---|---|---|
| 8,321,749 B1* | 11/2012 | Yeo | H03M 13/1105 714/752 |
| 9,197,365 B2* | 11/2015 | Felix | H04L 1/1835 |
| 2003/0056067 A1 | 3/2003 | Lawrence | |
| 2003/0061597 A1* | 3/2003 | Curtis | G06F 11/076 717/128 |
| 2003/0217246 A1 | 11/2003 | Kubota | |
| 2003/0218930 A1 | 11/2003 | Lehmann et al. | |
| 2008/0178189 A1* | 7/2008 | Findeisen | G06F 9/5016 718/104 |
| 2008/0276147 A1* | 11/2008 | Gho | H04L 1/1845 714/748 |
| 2014/0289584 A1* | 9/2014 | Chilappagari | G06F 11/1068 714/755 |

* cited by examiner

SIGNAL PROCESSING APPARATUS AND METHOD

FIELD OF THE DISCLOSURE

The present disclosure relates to a signal processing apparatus, a mobile communication device comprising the signal processing apparatus, and a method of operating a signal processing apparatus.

BACKGROUND TO THE DISCLOSURE

When transmitting data over wireless channels, errors will be introduced due to, for example, variations in the received signal quality. Wireless modems typically use forward error correction (FEC), where redundancy is incorporated in the transmitted signal by including parity bits calculated from the transmitted information bits according to a coding scheme. Therefore, the number of bits transmitted over the channel is larger than the number of information bits.

Another way to protect against transmission errors is to use an automatic repeat request (ARQ) scheme in which a receiver uses an error detection code, such as a cyclic redundancy check (CRC), to detect if a data packet is received correctly or not. If no error is detected, the receiving equipment sends a positive acknowledgement (ACK) to the sender of the data packet. On the other hand, if an error is detected, the receiving equipment sends a negative acknowledgement (NACK) to the sending equipment, which then retransmits the data packet.

The Long Term Evolution (LTE) communication standard, and many other digital communications standards such as the Universal Mobile Telephone Standard (UMTS) and the Code Division Multiple Access 2000 (CDMA2000) standard, use a combination of FEC and ARQ called hybrid ARQ (HARQ) with soft combining. In HARQ with soft combining, the energy in all transmissions of the same transport block is employed, each transport block comprising one or more code words. This means that an incorrectly received transport block needs to be stored in a buffer at the receiving equipment until the retransmitted transport block arrives. Both the initial and retransmitted transport blocks are then combined to obtain a single transport block that can be decoded with greater reliability than the initial or retransmitted transport block alone. The HARQ is asynchronous, meaning that the time interval between different transmissions of the same transport block may vary. The FEC that is used in LTE typically employs turbo codes, and the hardware that performs decoding is typically referred to as a turbo decoder. A turbo decoder employs soft data bits for the decoding, where a soft data bit comprises an indication of whether a received data bit is determined to be a binary one or zero, and an indication of reliability of that determination.

For example, a soft bit may be represented by an integer, INT, in the range −32 to +31, where a positive value indicates a binary one and a negative value indicates a binary zero, and the magnitude of the integer indicates a reliability of the soft bit. In particular, a value −32 of the integer of may mean that it is very likely that the received data bit was transmitted as a binary zero, that is, the received data bit is a binary zero having a high reliability, and a value of 31 of the integer may mean that it is very likely that the received data bit was transmitted as a binary one, that is, the received data bit is a binary one having a high reliability. A range of integers −32 to 31 requires six binary values to represent each integer, and therefore, each soft bit requires six memory cells to represent each received data bit. Each of the integers may correspond to a log-likelihood ratio (LLR) value.

The memory for the HARQ buffer can typically be Static Random Access Memory (SRAM) on the same integrated circuit chip as signal processing functionality, or Synchronous Dynamic Random Access Memory (SDRAM) on a different integrated circuit chip to the signal processing functionality. On-chip SRAM is fast, but is also typically small and expensive. So, for bad wireless channel conditions, where a lot of HARQ buffer memory is needed, on-chip SRAM might not provide enough memory at an acceptable cost. In this case the HARQ buffers can be placed in an external SDRAM. Each memory cell in an SDRAM comprises a capacitor that can be either charged or discharged to represent a binary value. As time passes, the charge in the capacitor leaks away. To overcome this leakage, the SDRAM is typically refreshed periodically, meaning that the binary value is read from each memory cell and then rewritten again to restore the charge of the capacitor to its original level. For a typical Low Power Double Data Rate 2 (LPDDR2) memory, a refresh occurs at intervals denoted $t_{REFI}$ in the standard JESD209-2B published by the JEDEC Solid State Technology Association. For a 1 Gbit density SDRAM at a temperature up to 85° C., $t_{REFI}$ is 7.8 µs. Such a memory is arranged as 8192 rows, with all memory cells in a row being refreshed simultaneously, and with each row being refreshed each 8192×7.8 µs=64 ms. For a temperature above 85° C., $t_{REFI}$ is decreased to 7.8 µs/4=1.95 µs. In this case, each row will be refreshed each 16 ms. Each refresh will consume energy. The refreshing also interferes with memory access, because no data can be transferred to or from the memory while the memory is being refreshed, thereby increasing latency. The average latency for reading memory when no refreshing is taking place is typically 20 ns. However, the time required to refresh one row is typically 130 ns, so every 7.8 µs access to the memory is blocked for 130 ns, at temperatures up to 85° C. In the present disclosure, memory storage that is subject to leakage of stored information is referred to as a leaky.

Typically, the majority of the retransmissions will occur before the memory cells need to be refreshed. However, when the HARQ with soft combining is asynchronous, as in the case of LTE, the retransmission can occur at any time. In particular, the delay following a NACK before a retransmission from a communication network can take place may depend on the network configuration and current network loading. Moreover, the delay may be longer for networks operating in a time division duplex (TDD) mode, rather than a frequency division duplex (FDD) mode, due to the separation in the time domain of uplink and downlink time slots.

SUMMARY OF THE PREFERRED EMBODIMENTS

According to a first aspect there is provided a method of operating a signal processing apparatus, comprising:
receiving a first signal representing a received data bit;
determining from the first signal a first soft data bit;
storing the first soft data bit in a leaky storage device;
receiving a second signal representing the received data bit;
determining from the second signal a second soft data bit;
reading from the leaky storage device the stored first soft data bit;
measuring an elapsed leakage time of the stored first soft data bit;

generating a third soft data bit dependent on the stored first soft data bit read from the leaky storage device and on the elapsed leakage time;

generating a fourth soft data bit by combining the second soft data bit and the third soft data bit;

decoding the received data bit dependent on the fourth soft data bit and on a selected plurality of further received data bits.

According to a second aspect there is provided a signal processing apparatus, comprising:

a receiver arranged for receiving a first signal representing a received data bit;

a demodulator arranged for determining from the first signal a first soft data bit;

a leaky storage device arranged for storing the first soft data bit;

wherein the receiver is arranged for receiving a second signal representing the data bit;

wherein the demodulator is arranged for determining from the second signal a second soft data bit;

a weighting stage arranged for reading from the leaky storage device the stored first soft data bit;

a timer arranged for measuring an elapsed leakage time of the stored first soft data bit;

wherein the weighting stage is arranged for generating a third soft data bit dependent on the stored first soft data bit read from the leaky storage device and on the elapsed leakage time;

a combining stage arranged for generating a fourth soft data bit by combining the second soft data bit and the third soft data bit; and a decoder arranged for decoding the received data bit dependent on the fourth soft data bit and on a selected plurality of further received data bits.

The signal processing apparatus and the method of operating a signal processing apparatus therefore enable leakage from the leaky storage device to be taken into account when using a stored soft data bit for decoding the received data bit, by adapting the soft data bit dependent on the time period for which the soft data bit has been stored during which leakage from the leaky storage device may have occurred, herein termed the elapsed leakage time. In this way, the reliability of decoding may be improved by taking account of leakage. Moreover, by taking account of leakage in this way, in some embodiments refreshing of the leaky storage device may be temporarily inhibited, or the frequency of refreshing may be decreased, thereby decreasing power consumption and reducing the latency of memory access, and in other embodiments non-refreshable memory may be used, thereby also avoiding the need for refresh circuitry.

In general, the elapsed leakage time is the time between the most recent refresh of the first soft data bit prior to the reading of the first soft data bit, and the reading of the first soft data bit, except if no refresh takes place between the storing of the first soft data bit and the reading of the first soft data bit, in which case the elapsed leakage time corresponds to the elapsed time between the storing and the reading of the first soft data bit, as, in relation to leakage, the storing is equivalent to a refresh.

The leaky storage device may be arranged for refreshing the stored first soft data bit, and the method may comprise inhibiting the leaky storage device from refreshing the stored first soft data bit between the storing and the reading. Likewise, in the signal processing apparatus, the leaky storage device may comprises refresh circuitry arranged for refreshing the stored first soft data bit and an inhibit stage arranged to inhibit the refresh circuitry from refreshing the stored first soft data bit between the storing and the reading. In this case, the elapsed leakage time corresponds to the elapsed time between the storing and the reading of the first soft data bit. This feature can enable readily available refreshable memory to be used, and can enable the frequency of refreshing the leaky storage device to be reduced, or may even eliminate the need for the refreshing, thereby reducing power consumption and reducing or eliminating refresh circuitry, and reducing the latency of memory access.

In the method, combining the second soft data bit and the third soft data bit may comprise selecting one of the second soft data bit and the third soft data bit. Likewise, in the signal processing apparatus, the combining stage may be arranged for combining the second soft data bit and the third soft data bit by selecting one of the second soft data bit and the third soft data bit. This feature enables a low complexity implementation. The selecting may be based on an indication of reliability of the second soft data bit and an indication of reliability of the third soft data bit. In particular, the selecting may comprise selecting whichever of the second soft data bit and third soft data bit has the higher reliability.

The method may comprise, prior to storing the first soft data bit and receiving the second signal, making a first attempt to decode the received data bit dependent on the first soft data bit and on a first plurality of further received data bits. Likewise, in the signal processing apparatus, the decoder may be arranged to, prior to the leaky storage device storing the first soft data bit and prior to the receiver receiving the second signal, make a first attempt to decode the received data bit dependent on the first soft data bit and on a first plurality of further received data bits. This feature can improve the reliability of decoding the received data bit by providing additional ways of decoding.

The method may comprise, prior to the reading from the leaky storage device, making a second attempt to decode the received data bit dependent on the second soft data bit and a second plurality of further received data bits. Likewise, in the signal processing apparatus, the decoder may be arranged to, prior to the weighting stage reading the stored first soft data bit from the leaky storage device, make a second attempt to decode the received data bit dependent on the second soft data bit and a second plurality of further received data bits. This feature can improve the reliability of decoding the received data bit by additional ways of decoding.

The third soft data bit may be, dependent on the elapsed leakage time, indicative of a lower reliability than a reliability indicated by the first soft data bit read from the leaky storage device. This feature can improve the reliability of decoding the received data bit.

Furthermore, if the elapsed leakage time is less than a time threshold, the third soft data bit may be indicative of a reliability equal to the reliability indicated by the first soft data bit read from the leaky storage device. This feature can improve the reliability of decoding the received data bit.

The method may comprise generating an indication of temperature of the leaky storage device at which the reading from the leaky storage device takes place, and the time threshold may be dependent on the indication of temperature. Likewise, the signal processing apparatus may comprise a temperature sensor arranged for generating an indication of temperature of the leaky storage device at which the reading from the leaky storage device takes place, and the time threshold may be dependent on the indication of temperature. This feature can improve the reliability of decoding the received data bit.

The method may comprise generating an indication of temperature of the leaky storage device at which the reading from the leaky storage device takes place, and a/the reliability indicated by the third soft data bit may be dependent on the indication of temperature. Likewise, the signal processing apparatus may comprise a temperature sensor arranged for generating an indication of temperature of the leaky storage device at which the reading from the leaky storage device takes place, and a/the reliability indicated by the third soft data bit may be dependent on the indication of temperature. This feature can improve the reliability of decoding the received data bit.

In the method, the decoding step may comprise error correction decoding. In particular, the error correction decoding may comprise turbo decoding. Likewise, in the signal processing apparatus, the decoder may be arranged to implement error correction decoding, in particular turbo decoding. These features can improve the reliability of decoding the received data bit.

The first signal may represent a code word comprising the received data bit and a/the first plurality of further received data bits.

Furthermore, the first signal may represent a transport block comprising the code word and at least one further code word. This feature can improve system efficiency.

According to a third aspect, there is provided a wireless communication device comprising the signal processing apparatus.

Preferred embodiments are described, by way of example only, with reference to the accompanying drawings.

DETAILED DESCRIPTION OF PREFERRED EMBODIMENTS

Figure 1:
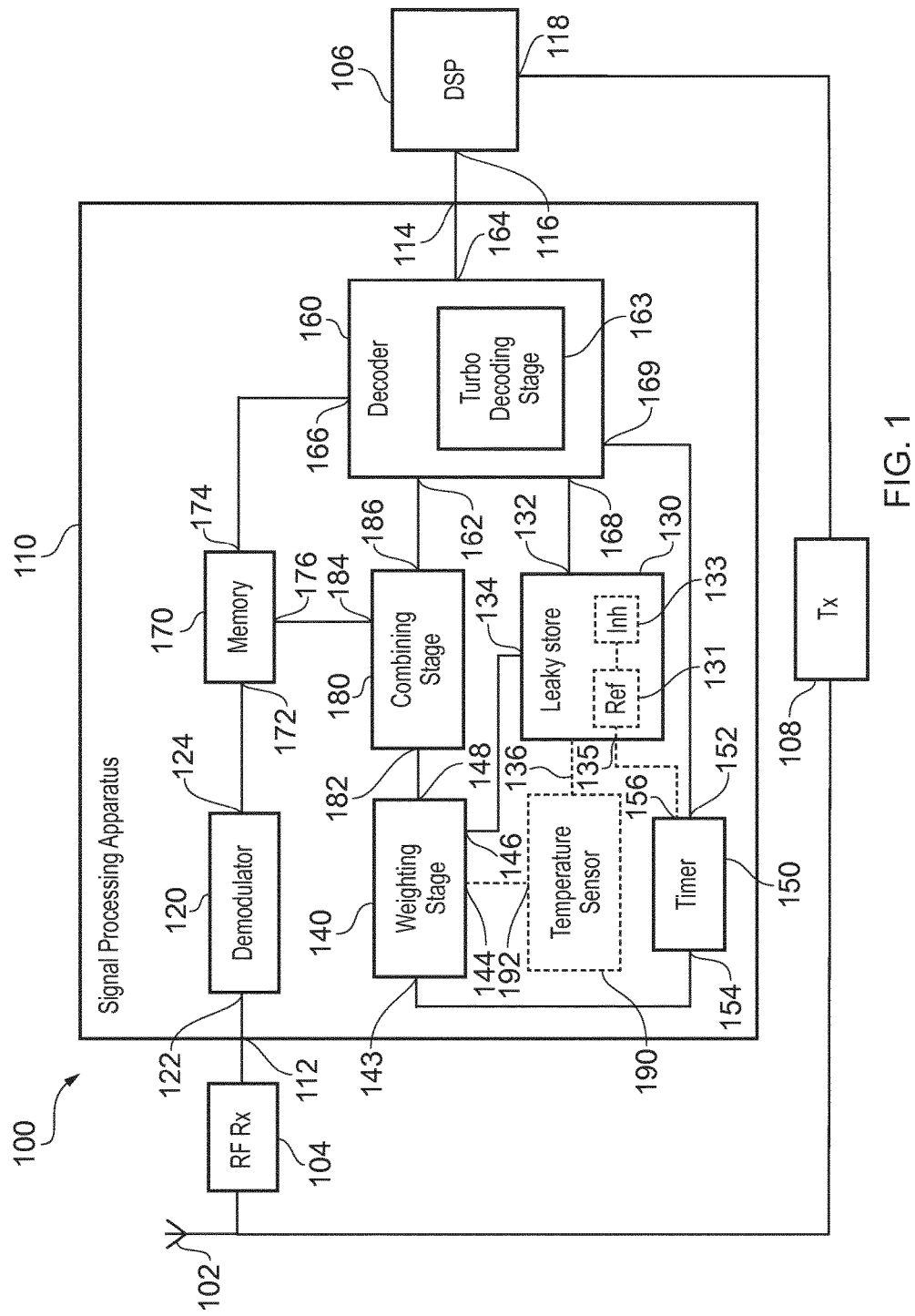
FIG. 1 is a block schematic diagram of a wireless communication device.

Referring to FIG. 1, a wireless communication device 100 comprises an antenna 102 coupled to an input 112 of a signal processing apparatus 110 by means of a radio frequency receiver (RF Rx) 104. A radio frequency signal received at the antenna 102 is down-converted and digitised by the radio frequency receiver 104, which delivers a baseband signal to the input 112 of the signal processing apparatus 110. The signal processing apparatus 110 demodulates the baseband signal to determine received data bits, decodes the received data bits, as described below, and delivers decoded data in the form of hard bits at an output 114 of the signal processing apparatus 110 that is coupled to an input 116 of a digital signal processor (DSP) 106. An output 118 of the DSP 106 is coupled to the antenna 102 by means of a transmitter (Tx) 108 for transmitting a positive acknowledgement, ACK, indicating to the sender of the data that the data has been successfully decoded. If the signal processing apparatus 110 is unable to decode the received data bits and deliver the decoded data to the DSP 106, it indicates this to the DSP 106, and the DSP 106 initiates transmission of a negative acknowledgement, NACK, by means of the transmitter 108, thereby requesting the sender of the data to retransmit the data.

Continuing to refer to FIG. 1, the signal processing apparatus 110 comprises a demodulator 120, a memory 170, a decoder 160, a leaky storage device 130, a timer 150, a weighting stage 140 and a combining stage 180. In the embodiment of FIG. 1, the signal processing apparatus 110 further comprises a temperature sensor 190, although this is not essential and may be omitted in other embodiments.

The input 112 of the signal processing apparatus 110 is coupled to an input 122 of the demodulator 120. The demodulator 120 demodulates the baseband signal and delivers soft data bits at an output 124 of the demodulator 120. The output 124 of the demodulator 120 is coupled to an input 172 of a memory element 170 for storing the soft data bits. A first input 166 of the decoder 160 is coupled to a first output 174 of the memory element 170 for reading the soft data bits. The decoder 160 comprises a turbo decoding stage 163 for decoding the soft data bits. An output 168 of the decoder 160 is coupled to an input 132 of the leaky storage device 130 for storing the soft data bits derived from the initial transmission of the radio frequency signal, in the case that a retransmission is required. The leaky storage device 130 has an output 134 for delivering the stored soft data bits when they are read from the leaky storage device 130. A timer port 169 of the decoder 160 is coupled to a first input 152 of the timer 150 for signalling to the timer 150 the storing of soft data bits into the leaky storage device 130.

In the embodiment of FIG. 1, the leaky storage device 130 comprises refresh circuitry 131 for refreshing soft data bits stored in the leaky storage device 130, and the refresh circuitry 131 is coupled to an inhibit stage 133 arranged to inhibit the refresh circuitry 131 from refreshing the soft data bits, between the storing and subsequent reading of the soft data bits. However, the refresh circuitry 131 and the inhibit stage 133 are not essential and in other embodiments may be omitted, in which case no refreshing of soft data bits stored in the leaky storage device 130 takes place. In further embodiments, the refresh circuitry 131 may be included for refreshing the soft data bits stored in the leaky storage device 130, but the inhibit circuitry 133 may be omitted, in which case a timer port 135 of the refresh circuitry 131 is coupled to a second input 156 of the timer 150 for signalling to the timer 150 the refreshing of the soft data bits stored in the leaky storage device 130.

The weighting stage 140 has an input 146 coupled to an output 134 of the leaky storage device 130 for reading stored soft data bits from the leaky storage device 130. The weighting stage 140 also has a timer port 142 coupled to an output 154 of the timer 150 for reading from the timer 150 an elapsed time since the soft data bits were last refreshed, or, if refreshing is inhibited or not provided, an elapsed time since the soft data bits were stored in the leaky storage device 130. Therefore, the timer 150 measures, or indicates, the elapsed time since the storing, or refreshing if employed, which ever is the most recent, during which leakage may occur, referred to in the present disclosure as the elapsed leakage time. The weighting stage 140 weights the soft data bits read from the leaky storage device 130 dependent on the elapsed leakage time measured by the timer 150. This weighting typically consists of reducing the reliability of the soft data bits read from the leaky storage device 130, with the reduction being greater the longer the elapsed leakage time is, although a time threshold may be employed, such that, when the leakage time is below the time threshold, the reliability of the soft data bits read from the leaky storage device 130 is unchanged by the weighting stage 140. The time threshold, therefore, corresponds to a time period over which the leakage is insignificant. In this way, the reliability of the soft data bits read from the leaky storage device 130 may be reduced by the weighting stage 140, relative to the soft data bits stored into the leaky storage device 130, to take account of leakage from the leaky storage device 130. The soft data bits generated by the weighting of the weighting stage 140 are delivered at an output 148 of the weighting stage 140.

The output 148 of the weighting stage 140 is coupled to a first input 182 of the combining stage 180. A second input 184 of the combining stage 180 is coupled to a second output 176 of the memory element 170 for receiving from the memory element 170 soft data bits derived from a retransmission of the data. The combining stage 180 combines the soft data bits delivered by the weighting stage 140 with the soft data bits received from the memory element 170, thereby generating combined soft data bits. The combining may be performed by, for example, selecting whichever of the respective soft data bits received from the memory element 170 and the weighting stage 140 has the higher reliability, or by summing the reliability of those respective soft data bits, or by averaging the reliability of those respective soft data bits. Alternatively, other methods of combining the respective soft data bits received from the memory element 170 and the weighting stage 140 may be used.

The output 186 of the combining stage 180 is coupled to a second input 162 of the decoder 160 for delivering the combined soft data bits to the decoder 160. The decoder 160 decodes the received data bits represented by the initial and retransmitted signals, by decoding the combined soft data bits.

The flow chart, illustrated in FIG. 2, of a method of operating the wireless communication device 100 is described in the following paragraphs. In general, radio frequency signals received at the antenna 102 will convey a sequence of data bits. However, for the purpose of clarity, the flow chart and the description thereof focus primarily on the transmission, and retransmission, of a single data bit. In particular, the single data bit is conveyed, for its initial transmission, by a first signal, and, for its retransmission, by a second signal. In general, the first signal is a portion of a more extensive initial signal that also conveys a first plurality of further data bits that form a code word or a plurality of code words, and the second signal is a portion of a more extensive retransmission signal that also conveys a second plurality of further data bits, also forming a code word or a plurality of code words, and at least some of which may be a retransmission of data bits of the initial signal.

Figure 2:
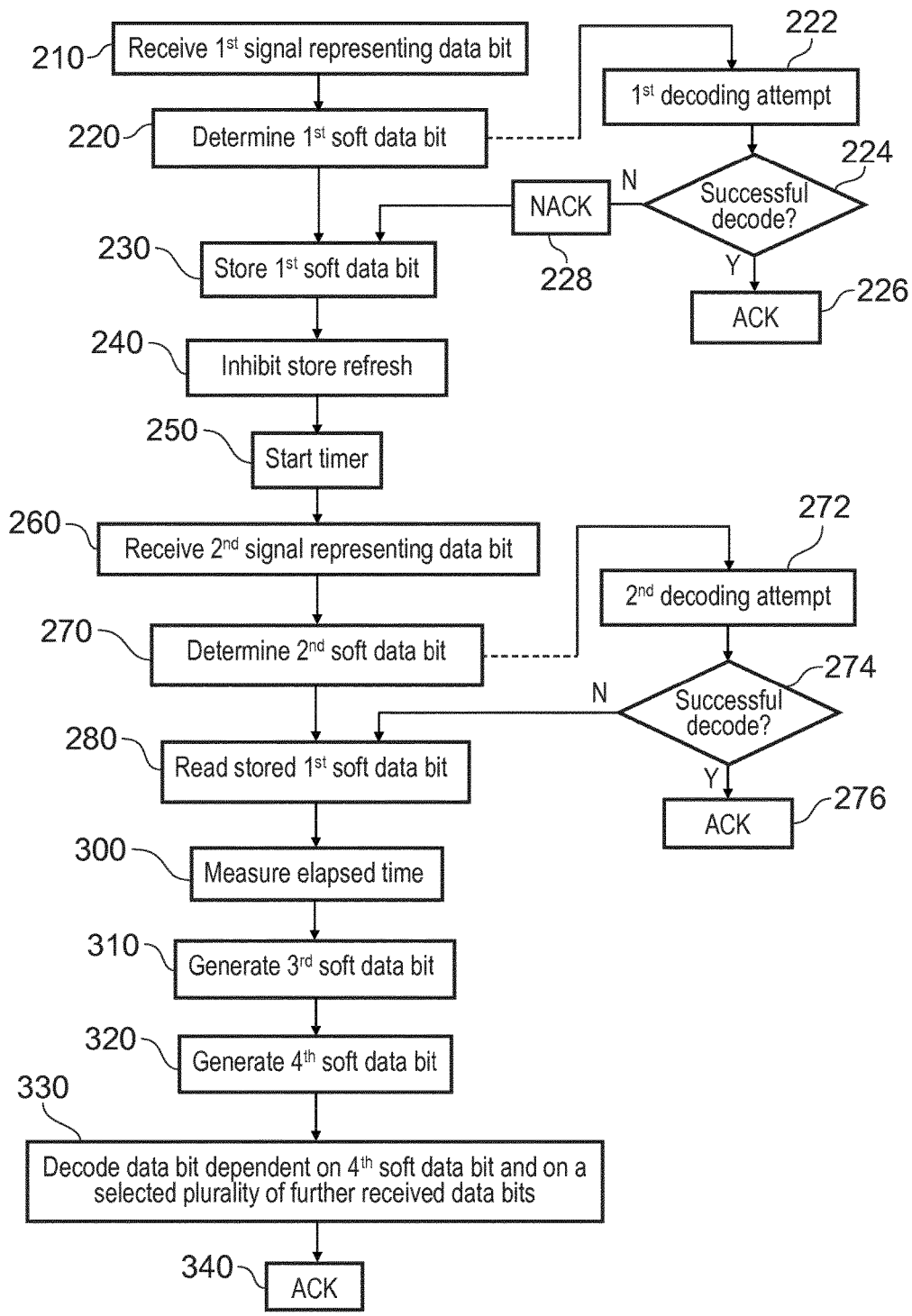
FIG. 2 is a flow chart of a method of operating a wireless communication device.

Referring to FIG. 2, at step 210, the first signal, which represents a received data bit, is received by the radio frequency receiver 104.

At step 220, the first soft data bit is determined from the first signal, for example by the demodulator 120. The first soft data bit comprises an indication of a first data value, either a binary one or a binary zero, and a first indication of reliability of the first data value. The first soft data bit may comprise an integer, INT, of the form described above.

Flow may then proceed to step 230 where the first soft data bit is stored in the leaky storage device 130 by the decoder 160. Optionally, before proceeding to step 230, flow may proceed to step 222 where a first attempt at decoding the first soft data bit is made by the decoder 160, in conjunction with a first plurality of further received data bits that, together with the first soft data bit, form a code word.

At step 224, it is determined whether the first decoding attempt has been successful. If the first decoding attempt is successful, flow proceeds to step 226 at which a positive acknowledgement, ACK, is transmitted to the sender of the first signal, and the method terminates. If the first decoding attempt is unsuccessful, flow proceeds to step 228 at which a negative acknowledgement, NACK, is transmitted to the sender of the first signal, thereby requesting a retransmission of the first signal, and then flow proceeds to step 230 where the first soft data bit is stored in the leaky storage device 130.

At step 240, if the leaky storage device 130 is refreshable, the leaky storage device 130 may be inhibited from refreshing the stored first soft data bit, and at step 250 the timer 150 is started for measuring the time elapsed since the first soft data bit was stored in the leaky storage device 130. Alternatively, in other embodiments, if the leaky storage device 130 is refreshable, the leaky storage device 130 need not be inhibited from refreshing the stored first soft data bit, and at step 250 the timer 150 is started for measuring the time elapsed since the first soft data bit was stored in the leaky storage device 130, and then restarted when the stored first soft data bit is refreshed, thereby measuring the time elapsed since the first soft data bit was stored in the leaky storage device 130, or the time elapsed since the most recent refresh of the stored first soft data bit, which ever is shortest. Alternatively, in further embodiments, if the leaky storage device 130 is not refreshable, step 240 may be omitted, and flow proceeds from step 230 to step 250 at which the timer 150 is started for measuring the time elapsed since the first soft data bit was stored in the leaky storage device 130. For all of these embodiments, the time indicated by the timer 150 is referred to as the elapsed leakage time.

At step 260, the second signal, which also represents the received data bit, being a retransmission of the first signal, is received by the radio frequency receiver 104.

At step 270, the second soft data bit is determined from the second signal by the demodulator 120. The second soft data bit comprises an indication of a second data value, either a binary one or a binary zero, and an indication of reliability of the second data value. The second soft data bit may comprise an integer, INT, of the form described above.

Optionally, before proceeding to step 280, flow may proceed to step 272 where an attempt at decoding the second soft data bit in conjunction with second further received data bits is made, referred to as a second decoding attempt, by the decoder 160. At step 274, it is determined whether the second decoding attempt has been successful. If the second decoding attempt is successful, flow proceeds to step 276 at which a positive acknowledgement, ACK, is transmitted to the sender of the second signal, and the method terminates. If the second decoding attempt is unsuccessful, flow proceeds to step 280.

At step 280, the stored first soft data bit is read from the leaky storage device 130 by the weighting stage 140.

At step 300, the timer 150 is read, thereby measuring the elapsed leakage time of the first soft data bit. This elapsed leakage time is, in general, variable because the time interval between receiving the first signal and receiving the second signal is variable, being dependent on the loading of the sender of these signals, typically a base station in a mobile communication network. For example, the time interval between receiving the first signal and receiving the second signal may normally be considerably shorter time than the 64 ms that is the typical refresh time for a SDRAM, but may sometimes be longer.

At step 310, a third soft data bit is generated by the weighting stage 140 dependent on the stored first soft data bit read from the leaky storage device 130 and on the elapsed leakage time of the first soft data bit. In particular, the third soft data bit may be generated by modifying the stored first soft data bit read from the leaky storage device 130 by an amount dependent on the elapsed leakage time of the first soft data bit. In general, the third soft data bit indicates a lower reliability than a reliability indicated by the first soft data bit read from the leaky storage device 130, although the time threshold may be applied such that, if the elapsed leakage time is less than the time threshold, the third soft data bit indicatives a reliability equal to the reliability indicated by the first soft data bit read from the leaky storage device 130. For example, if the first soft bit read from the leaky storage device 130 is represented by an integer, INT, in the range −32 to +31, where a value of −32 means that it is very likely that the received data bit was a binary zero, and a value of 31 means that it is very likely that the received data bit was a binary one, the third soft data bit may be generated by modifying the integer INT by a function D(t) of the elapsed leakage time t. In particular, if the first soft data bit read from the leaky storage device 130 has a positive value, the third soft data bit may have a value INT−D(t), and if the first soft bit read from the leaky storage device 130 has a negative value, the third soft data bit may have a value INT+D(t), in both cases subject to the constraint that the third soft data bit does not have the opposite sign to the integer INT. Expressed mathematically, therefore, the third soft data bit may be written as:

max(0,INT−$D(t)$) if INT>0, and min(0,INT+$D(t)$) if INT<0.

Figure 3:
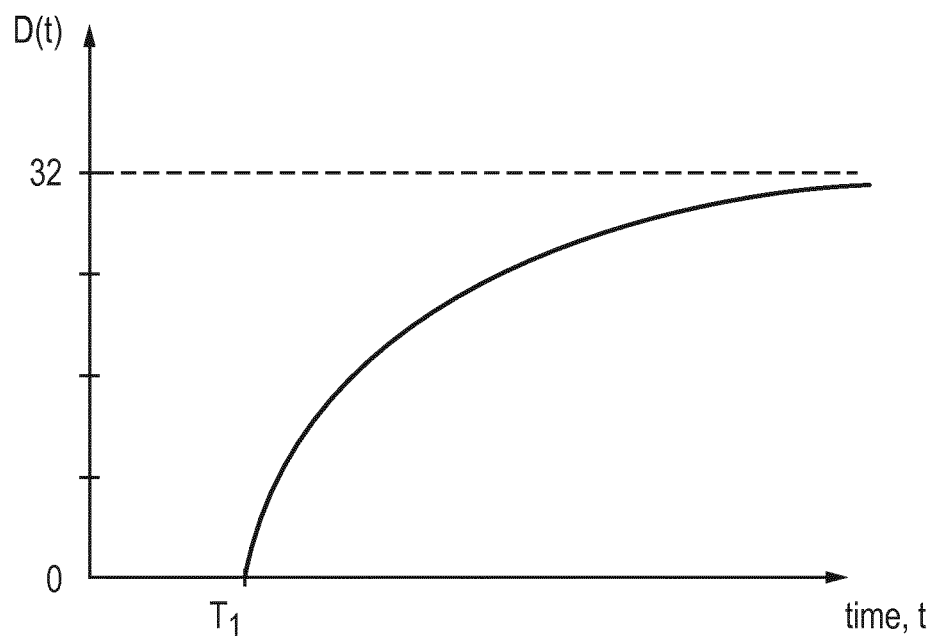
FIG. 3 is a graph illustrating a dependence of reliability on time.

FIG. 3 illustrates an example of the function D(t), where D(t) is zero for an elapsed leakage time t less than a time threshold $T_1$, corresponding to the elapsed leakage time below which no significant leakage occurs from the leaky storage device 130, and D(t) increases monotonically at a decreasing rate as the elapsed leakage time t increases over the threshold time $T_1$, reaching a maximum value of 32. The time threshold $T_1$ may be, for example 64 ms, whether or not the leaky storage device 130 comprises refresh circuitry 131 for refreshing soft data bits stored in the leaky storage device 130, and whether or not the leaky storage device 130 comprises the inhibit stage 133 arranged to inhibit the refresh circuitry 131 from refreshing. Typically, the time threshold $T_1$ may be the same as, or similar to, the interval between refreshes employed in the prior art, but in embodiments according to the present disclosure in which refreshing is employed for refreshing soft data bits stored in the leaky storage device 130, the interval between refreshes may be longer than in the prior art, and therefore longer than the time threshold $T_1$, thereby conserving power.

Alternatively, the third soft data bit may be generated dependent on the stored first soft data bit read from the leaky storage device 130 and on the elapsed leakage time of the first soft data bit using other criteria, and in particular using other functions D(t). The function D(t) may be implemented by means of a look-up table in the weighting stage 140.

At step 320, a fourth soft data bit is generated by the combining stage 180 by combining the second soft data bit and the third soft data bit using a combining method such as selection, averaging or summing, as described above in relation to the combining stage 180.

At step 330, the received data bit represented by the first signal and by second signal is decoded dependent on the fourth soft data bit and on a selectable plurality of further received data bits, by the decoder 160. The selectable plurality of further receiver data bits may comprise data bits selected, or otherwise combined, from the first and second plurality of further received data bits.

At step 340, transmission of a positive acknowledgement, ACK, to the sender of the first and second signals is initiated if the decoding at step 830 has been successful, according to a decoding criterion, or a negative acknowledgement, NACK, may be transmitted if the decoding criterion is not fulfilled.

In some applications, such as in the mobile communication device 100, the temperature of the signal processing apparatus 110, and in particular of the leaky storage device 130, may become high, for example exceeding 85° C., due to reception of a large quantity of data at a high bit rate using a processor clocked at a high frequency. The rate of leakage from the leaky storage device 130 may be dependent on temperature of the leaky storage device 130. Therefore, referring again to FIG. 1, the signal processing apparatus 110 may, in some embodiments, additionally comprise the temperature sensor 190 linked to the leaky storage device 130 by means of a link 136 and arranged for generating an indication of temperature of the leaky storage device 130 at which the reading of the stored first soft data bit from the leaky storage device 130 takes place. The temperature sensor 190 may be located close to the leaky storage device 130, as illustrated in FIG. 1, or may be located within the leaky storage device 130. In particular, if the leaky storage device comprises SDRAM, the temperature sensor 190 may be embedded in the SDRAM. An output 192 of the temperature sensor 190 is coupled to a third input 144 of the weighting stage 140 for delivering the indication of temperature of the leaky storage device 130. In such embodiments, for the generation of the third soft data bit by the weighting stage 140 at step 310 of the flow chart of FIG. 2, the time threshold $T_1$ may be dependent on the indication of temperature. For example, the time threshold $T_1$ may be 64 ms when the temperature of the leaky storage device 130 is less that 85° C., and have lower value, for example 16 ms, when the temperature of the leaky storage device 130 exceeds 85° C. Furthermore, the amount by which the stored first soft data bit read from the leaky storage device 130 is modified by the weighting stage 140 to generate the third soft data bit, and in particular the function D(t), may be dependent on the indication of temperature of the leaky storage device 130 generated by the temperature sensor 190, with the decrease in reliability increasing with increasing temperature.

Figure 4:
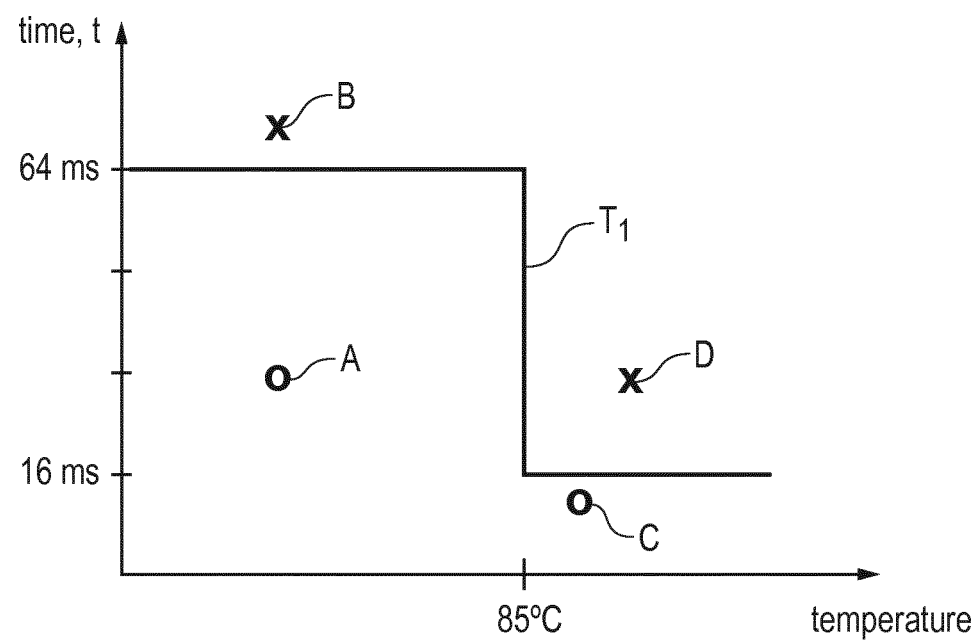
FIG. 4 is a graph illustrating dependence of reliability on time and temperature.

FIG. 4 is a graph showing examples illustrating the dependence of reliability of the third soft data bit on time and temperature for scenarios in which the time threshold $T_1$ is 64 ms for temperature up to 85° C. and 16 ms for temperatures exceeding 85° C. In FIG. 4, point A represents a first scenario in which the leaky storage device 130 has a temperature of less than 85° C. and the first soft data bit is read from the leaky storage device 130 at an elapsed leakage time of 32 ms. In this first scenario, the reliability of the third soft data bit is selected to be equal to the reliability of the first soft data bit. Point B represents a second scenario in which the leaky storage device 130 has a temperature of less than 85° C. and the first soft data bit is read from the leaky storage device 130 later than the time threshold $T_1$ of 64 ms. In this second scenario, the reliability of the third soft data bit is selected to be less than the reliability of the first soft data bit by applying the function D(t) of FIG. 3, which is applicable at temperatures up to 85° C. In FIG. 4, point C represents a third scenario in which the leaky storage device 130 has a temperature exceeding 85° C. and the first soft data bit is read from the leaky storage device 130 at an elapsed leakage time of less than 16 ms. In this third scenario, the reliability of the third soft data bit is selected to be equal to the reliability of the first soft data bit. Point D represents a fourth scenario in which the leaky storage device 130 has a temperature exceeding 85° C. and the first soft data bit is read from the leaky storage device 130 at an elapsed leakage time of 32 ms, which is later than the time threshold $T_1$ applicable at temperatures exceeding 85° C. In this fourth scenario, the reliability of the third soft data bit is selected to be less than the reliability of the first soft data bit by applying the same, or different, function D(t) applicable at temperatures exceeding 85° C.

Other variations and modifications will be apparent to the skilled person. Such variations and modifications may involve equivalent and other features which are already known and which may be used instead of, or in addition to, features described herein. For example, although the leaky storage device 130 may comprise capacitive memory such as SDRAM, this is not essential and alternatively the leaky storage device 130 may comprise another type of leaky memory in which information stored in the memory leaks away with time. Although the leaky storage device 130 may comprise memory cells that are either charged or discharged to represent a binary one or a binary zero, this is not essential and alternatively the leaky storage device 130 may comprise other types of memory cells. For example, memory cells that are charged with one polarity to represent a binary one and are charged with the opposite polarity to represent a binary zero may be employed.

Although wireless communication, and in particular LTE, has been used as an example, the invention also has application in other fields of communication.

Although an ARQ scheme, in which retransmission of data is requested when required, has been used as an example, the invention also has application in other schemes in which data may be received more than once, such as time, frequency or space diversity schemes, code division multiplex schemes, or multiple input multiple output (MIMO) schemes.

Although turbo decoding has been used as an example of error correction, other types of error correction coding and decoding may alternatively be used.

Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that where a component is described as being "arranged to" or "adapted to" perform a particular function, it may be appropriate to consider the component as merely suitable "for" performing the function, depending on the context in which the component is being considered. Throughout the text, these terms are generally considered as interchangeable, unless the particular context dictates otherwise. It should also be noted that the figures are not necessarily to scale; emphasis instead generally being placed upon illustrating the principles of the present invention.

The invention claimed is:

1. A method of operating a signal processing apparatus, the method comprising:

receiving a first signal representing a received data bit;
determining a first soft data bit from the first signal;
storing the first soft data bit in a leaky storage device;
receiving a second signal representing the received data bit;
determining a second soft data bit from the second signal;
reading the stored first soft data bit from the leaky storage device;
measuring an elapsed leakage time of the stored first soft data bit;
generating a third soft data bit based on the stored first soft data bit read from the leaky storage device and on the elapsed leakage time;
generating a fourth soft data bit by combining the second soft data bit and the third soft data bit;
decoding the received data bit based on the fourth soft data bit and on a selected plurality of further received data bits.

2. The method of claim 1:
wherein the leaky storage device is configured to refresh the stored first soft data bit;
wherein the method further comprises inhibiting the leaky storage device from refreshing the stored first soft data bit between the storing and the reading.

3. The method of claim 1, wherein the combining the second soft data bit and the third soft data bit comprises selecting one of the second soft data bit and the third soft data bit.

4. The method of claim 1, further comprising, prior to the storing the first soft data bit and receiving the second signal, making a first attempt to decode the received data bit based on the first soft data bit and on a first plurality of further received data bits.

5. The method of claim 1, further comprising, prior to the reading from the leaky storage device, making a second attempt to decode the received data bit based on the second soft data bit and on a second plurality of further received data bits.

6. The method of claim 1, wherein, depending on the elapsed leakage time, the third soft data bit is indicative of a lower reliability than a reliability indicated by the first soft data bit read from the leaky storage device.

7. The method of claim 6, wherein, if the elapsed leakage time is less than a time threshold, the third soft data bit is indicative of a reliability equal to the reliability indicated by the first soft data bit read from the leaky storage device.

8. The method of claim 7:
further comprising generating an indication of temperature of the leaky storage device at which the reading from the leaky storage device takes place; and
wherein the time threshold is based on the indication of temperature.

9. The method of claim 1:
further comprising generating an indication of temperature of the leaky storage device at which the reading from the leaky storage device takes place; and
wherein a reliability indicated by the third soft data bit is based on the indication of temperature.

10. The method of claim 1, wherein the decoding comprises error correction decoding.

11. The method of claim 10, wherein the error correction decoding comprises turbo decoding.

12. The method of claim 1, wherein the first signal represents a code word comprising the received data bit and the plurality of further received data bits.

13. The method of claim 12, wherein the first signal represents a transport block comprising the code word and at least one further code word.

14. A signal processing apparatus, comprising:
- a receiver configured to receive a first signal representing a received data bit and to receive a second signal representing the data bit;
- a demodulator configured to determine a first soft data bit from the first signal and to determine a second soft data bit from the second signal;
- a leaky storage device configured to store the first soft data bit;
- a weighting stage configured to read the stored first soft data bit from the leaky storage device;
- a timer configured to measure an elapsed leakage time of the stored first soft data bit;
- wherein the weighting stage is configured to generate a third soft data bit based on the stored first soft data bit read from the leaky storage device and on the elapsed leakage time;
- a combining stage configured to generate a fourth soft data bit by combining the second soft data bit and the third soft data bit; and
- a decoder configured to decode the received data bit based on the fourth soft data bit and on a selected plurality of further received data bits.

15. A mobile communication device, comprising:
- a signal processing apparatus, the signal processing apparatus comprising:
  - a receiver configured to receive a first signal representing a received data bit and to receive a second signal representing the data bit;
  - a demodulator configured to determine a first soft data bit from the first signal and to determine a second soft data bit from the second signal;
  - a leaky storage device configured to store the first soft data bit;
  - a weighting stage configured to read the stored first soft data bit from the leaky storage device;
  - a timer configured to measure an elapsed leakage time of the stored first soft data bit;
  - wherein the weighting stage is configured to generate a third soft data bit based on the stored first soft data bit read from the leaky storage device and on the elapsed leakage time;
  - a combining stage configured to generate a fourth soft data bit by combining the second soft data bit and the third soft data bit; and
  - a decoder configured to decode the received data bit based on the fourth soft data bit and on a selected plurality of further received data bits.

* * * * *